United States Patent [19]

Wallace et al.

[11] Patent Number: 4,726,493
[45] Date of Patent: Feb. 23, 1988

[54] ACTUATOR VALVE FOR DISPENSER OF CARBONATED BEVERAGES

[75] Inventors: Robert P. Wallace, Katonah; William P. Nugent, Salem, both of N.Y.; Kenneth C. Newton, Danbury, Conn.

[73] Assignee: Brewster Plastics, Inc., Croton Falls, N.Y.

[21] Appl. No.: 30,980

[22] Filed: Mar. 27, 1987

[51] Int. Cl.⁴ .................. B67D 3/02; F16K 11/02; F16K 25/02
[52] U.S. Cl. .................. 222/129.1; 137/625.27; 251/330
[58] Field of Search .............. 137/625.27; 251/330; 222/129.1, 129.2, 129.3, 129.4, 136, 137, 145

[56] References Cited

U.S. PATENT DOCUMENTS

| | | | |
|---|---|---|---|
| 1,921,092 | 8/1933 | Newton | 137/625.27 |
| 2,427,429 | 9/1947 | Waite et al. | 222/129.3 |
| 3,503,540 | 3/1970 | Fuerst | 222/129.1 |
| 3,863,810 | 2/1975 | Hanson | 222/129.1 |
| 3,913,620 | 10/1975 | Pauliukonis | 137/625.27 X |
| 4,085,775 | 4/1978 | Steele, Jr. | 137/625.27 X |
| 4,304,736 | 12/1981 | McMillin et al. | 222/129.1 X |
| 4,317,469 | 3/1982 | Pauliukonis | 137/625.27 X |

FOREIGN PATENT DOCUMENTS

| | | | |
|---|---|---|---|
| 2289826 | 2/1976 | France | 137/625.27 |
| 177475 | 11/1982 | Japan | 137/625.27 |

Primary Examiner—Joseph J. Rolla
Assistant Examiner—Kevin P. Shaver
Attorney, Agent, or Firm—Mark T. Basseches; Paula T. Basseches

[57] ABSTRACT

An improved home dispenser of carbonated beverages is disclosed, together with a novel actuator valve mechanism. The valve mechanism may be shifted from the non-dispensing to the dispensing mode with minimum of applied force by reason of the interaction between sealing gaskets carried by the valve stem and complemental gasket enveloping skirts formed within the valve, the skirts being calculated to be radially outwardly deformed by pressure applied by the gaskets.

9 Claims, 5 Drawing Figures

ACTUATOR VALVE FOR DISPENSER OF CARBONATED BEVERAGES

BACKGROUND OF THE INVENTION

1. Field of the Invention

The present invention is directed to improvements in the field of home dispenser devices for carbonated beverages.

2. The Prior Art

Commercial apparatus for dispensing carbonated beverages typically comprises cylinders of carbon dioxide which function to carbonate water dispensed. Such devices may include means for metering quantities of flavorants into the carbonated water. Devices of the type described typically operate at high pressures, in the area of 150 to 250 psi. Additionally, such installations require substantial storage space for the operative unit.

It has been proposed to provide a dispenser for home use. Desirably such dispenser must occupy minimum space, be easy to operate and, for safety reasons, function utilizing gas pressures well below those employed in commercial establishments, i.e. pressures in the order of about 50 psi.

A further desideratum of a home carbonated beverage dispenser is that the same be capable of being activated by pressure against the dispensing valve exerted by the container which is to be filled. In this way it is assured that the fluid stream will be directed into the container. Since the containers which may be employed in the home environment may be expected to run the gamut between rigid glass or plastic materials and readily deformed softer materials, such as expanded polystyrene, wax paper cups, etc., it is necessary that the home beverage dispenser valve be susceptible of being triggered with an absolute minimum of force.

While attempts have been made to utilize conventional four-way valves in home dispensers, the force necessary to shift the phase of such valves has been unduly high, precluding the use of readily deformed containers.

Attempts to utilize force magnifying levers to facilitate the triggering of conventional valves has created problems of a different sort, namely, by providing a force multiplying but long throw lever, substantial movement of the container to and away from the filling position is encountered, with resultant high incidence of spillage.

Whereas the valving of commercial units is expected to be frequently serviced, with replacement and repair of gasketting, etc. as necessary, the home unit is expected to operate over protracted periods and multiple operating cycles without compromise or leakage since frequently the initial cost of such units will not justify repair.

SUMMARY OF THE INVENTION

The present invention may be summarized as directed to an improved carbonated beverage dispenser for home use.

More particularly, the invention is directed to a dispenser and actuating valve therefor, which valve is of unique construction, enabling the same to be tripped or shifted from the non-dispensing to the dispensing condition with a minimum amount of exerted forces, the valve, in addition, providing effective sealing and extremely long life cycle.

In accordance with the invention, a home dispensing device for carbonated beverages includes an actuator valve having a pair of polymeric inserts within which a valve spool is movable between limiting positions, respectively shut and dispensing.

A charactering feature of the invention resides in the provision on the inserts of cylindrical, reduced gauge skirts which are readily expansible when traversed by the sealing components of the spool. The distal ends of the skirts are clear of any contact with others of the valve components, thereby to avoid any interference with the radial expansibility of the skirts.

The sealing effect is achieved in part by a radial distension of the skirts and, in addition, by a compression of O-rings which traverse the skirts. However, due to the radial expansibility of the skirts, the degree of compression of the O-rings necessary to achieve a seal is reduced, whereby the deformation of the O-rings is minimized and, hence, their life cycle greatly extended. Moreover, the force required to shift the O-rings axially within the skirts is sufficiently low as to permit an easy sliding movement without compromise of sealing efficiency, thus to minimize the force necessary to shift the spool.

Optionally, the skirts may be radially flared at their distal ends so as to minimize wear on the O-rings as the same translate from the surface of a skirt to other portions of the valve body, and vice versa.

The valve components are mounted in assembled condition by a spring clamp member which includes tangs which embed slightly into the polymeric material defining the valve body. There is thus no positive restraints against outward movement of the clamps other than their slight embedment into the valve body. The clamps thus act in the manner of a safety device such that, in the event of failure of the pressure regulator and the presence of unduly high pressures at the dispensing valve components, the inserts will simply be forced clear of the valve and the pressures bled, a result which, while disabling the dispensing device, minimizes the possibility of injury.

It is accordingly an object of the invention to provide an improved home dispenser device for carbonated beverages, and more particularly a dispensing device of the type described wherein tripping of the actuator valve may be accomplished with low force components, thereby enabling the use of expanded polystyrene or wax paper cups.

A further object of the invention is the provision of a device of the type described and of a valve for use therein characterized in that the same may be employed over a protracted life cycle without compromise of sealing functions.

Still a further object of the invention in the provision of a device of the type described having safety features, minimizing the chance of injury by reason of malfunction of the pressure reducer components of the system.

A still further object of the invention is the provision of a valve for a home carbonated beverage dispenser which may be fabricated at low cost.

To attain these objects and such further objects as may appear herein or be hereinafter pointed out, reference is made to the accompanying drawings forming a part hereof in which FIG. 1 is a perspective view of a carbonated beverage dispensing device in accordance with the invention;

Figure 1:
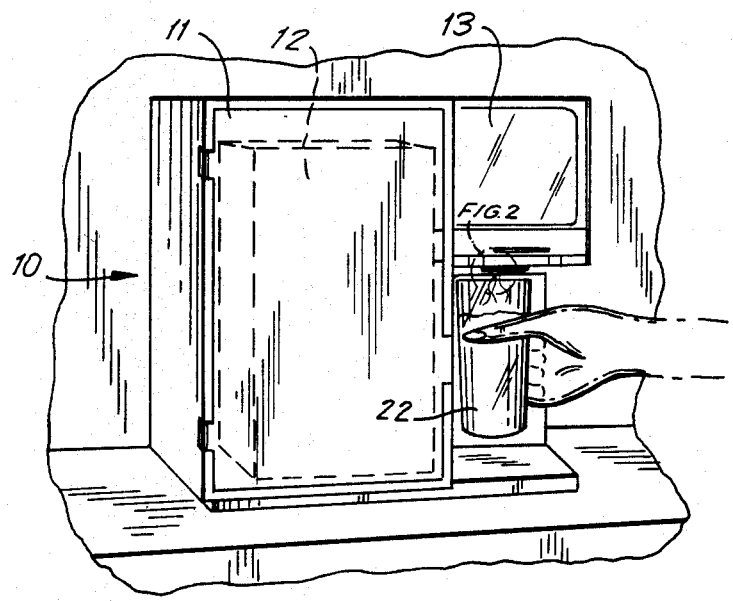

Referring now to FIG. 1, there is shown a carbonated beverage dispenser 10 for use in the home, the dispenser including a closed chamber 11 within which is contained a reservoir 12 of carbonated water. An enclosure 13 encompasses a syrup dispenser 14, a $CO_2$ cartridge, and a regulator mechanism for reducing the gas pressure in the system.

Figure 2:
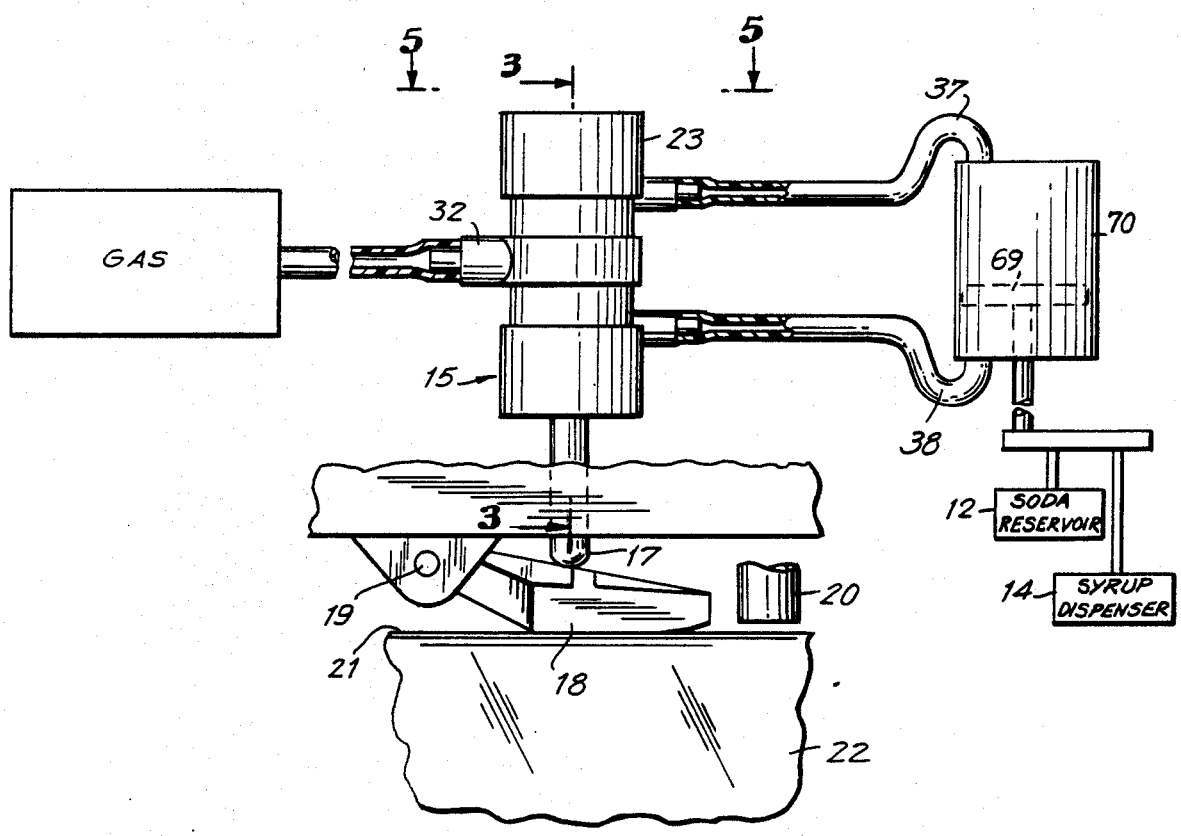
FIG. 2 is a magnified view of the portion of the dispensing device encircled in FIG. 1 combined with a side elevational view of the valve in accordance with the invention, with schematic illustrations of other conventional components of the, system.

Since the details of the syrup dispensing device, carbonator, and reservoir 12 are known per se, the same are merely schematically illustrated in FIG. 2.

Figure 3:
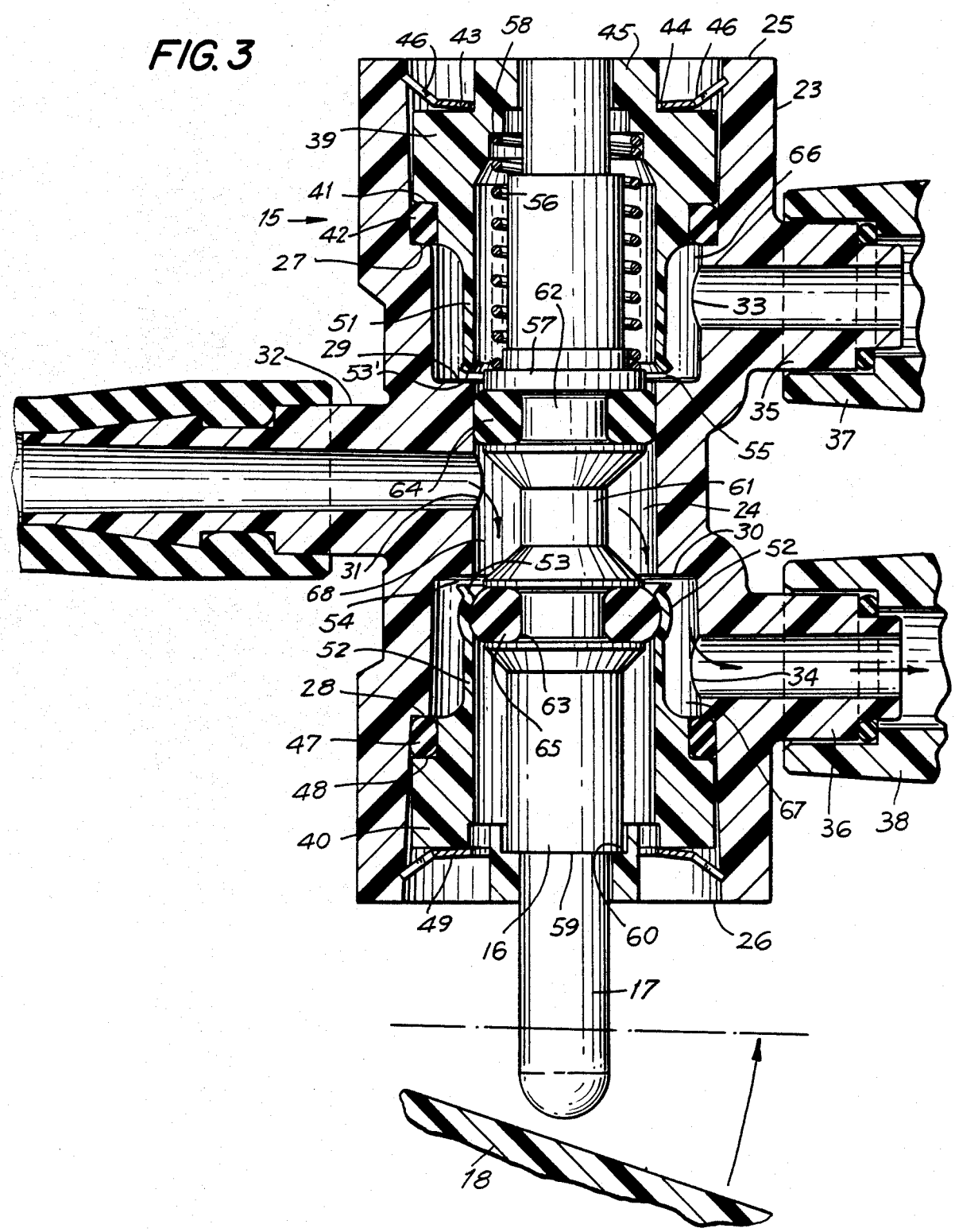
FIGS. 3 and 4 are magnified cross-sectional views of the valve illustrated in FIG. 2, respectively in the non-dispensing and dispensing conditions thereof, the view being taken on the section 3—3 of FIG. 2.
Figure 4:
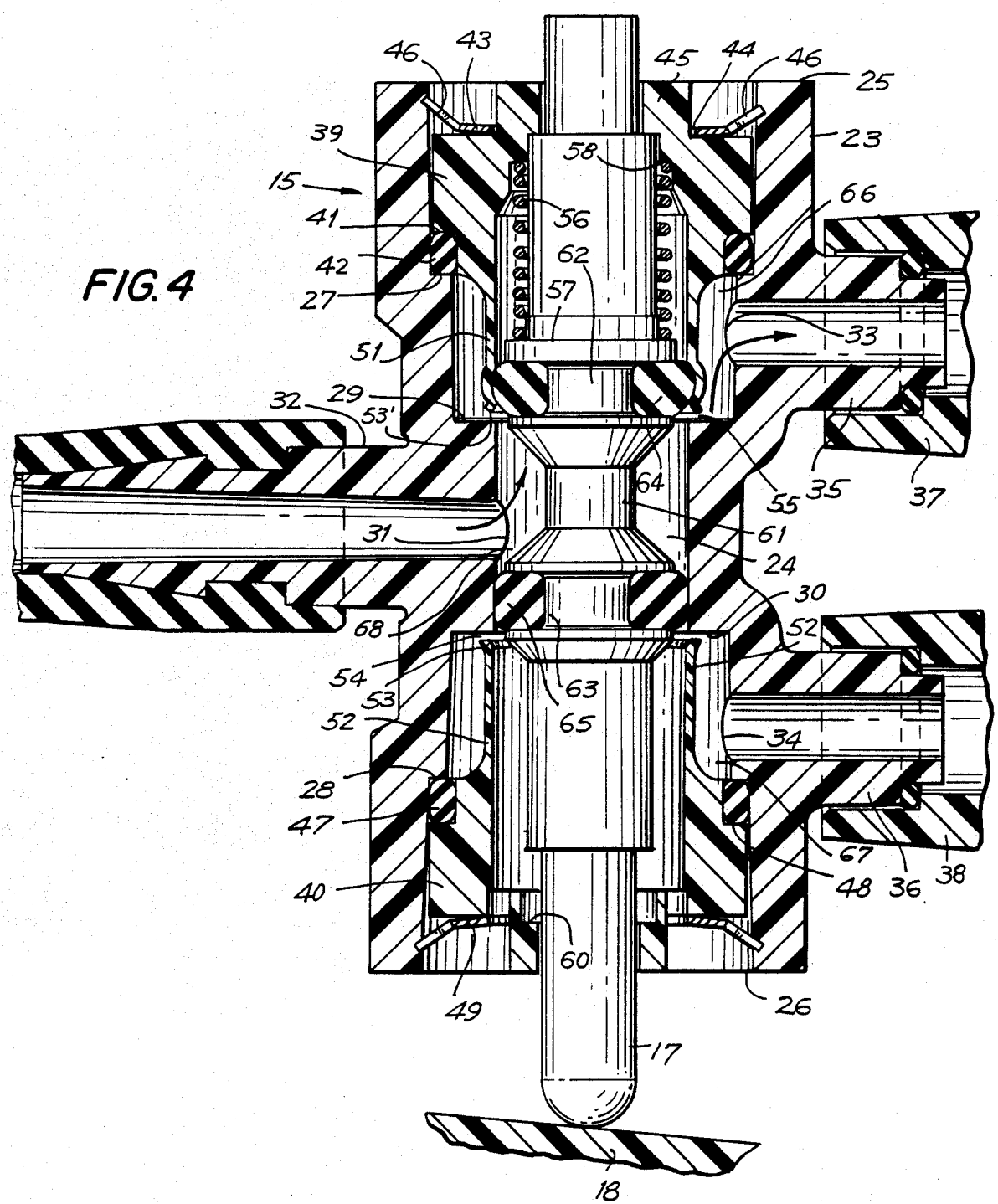
Figure 5:
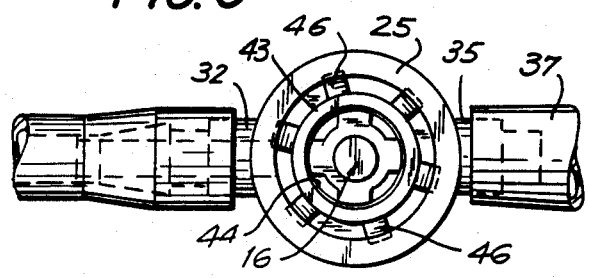
FIG. 5 is an end elevational view of the valve taken in the direction of the arrows 5—5 of FIG. 2.

Central to the instant invention is the dispensing valve 15 illustrated more specifically in FIGS. 3, 4 and 5.

The valve 15 is located beneath the enclosure 13 and includes a spool member 16 having a depending plunger or trip end 17. The trip end 17 is located directly above a dispenser paddle 18, forming a lever pivotally connected as at 19 to the undersurface of the container.

The paddle 18 is located proximate a dispenser spout 20 such that when the paddle 18 is lifted by the rim 21 of a glass or like container 22 soda will be dispensed into the glass.

The valve 15 comprises a cylindrical molded polymeric body 23 having a through-going bore 24 extending from upper end 25 to lower end 26.

The body 23 is symmetrical about its transverse axis and includes upper and lower annular stop shoulders 27, 28 inwardly spaced from the ends 25, 26, respectively. The body includes, in addition, radially extending upper and lower annular metering shoulders 29, 30, respectively, The valve, which is of the four-way type, includes a central input port 31 from which projects nipple 32.

The body is also provided with upper and lower outlet ports 33, 34 having nipples 35, 36 to which are connected conduits 37, 38, respectively.

The ends 25, 26 of the bore are sealed by upper and lower insert members 39, 40, respectively. The upper insert 39 includes a radially outwardly extending annular shoulder 41 which is disposed in spaced relation to shoulder 27, an O-ring or like gasket 42 being compressed between the said shoulders 27 and 41.

Insert 39 is maintained in its mounted position by a spring clamp member 43 having a central aperture 44 surrounding hub 45 of the insert.

The valve body 23 is formed of a molded polymeric material such as Nylon, Delrin or the like and is the substantially softer than the metallic spring clamp 43.

The clamp 43 includes radially projecting legs 46. When the clamp member is forced into the end 25 of the valve body, the distal ends of the legs are compressed inwardly and under the outward compressive force of the clamp member dig into the body of the valve member and thus resist outward movement.

The lower insert 40 is similarly mounted in the lower end 26 with gasket 47 compressed between shoulder 28 within the valve body and complemental radially outwardly extending shoulder 48 of the lower insert 40.

Spring clamp member 49 surrounds hub member 50 of the lower insert in the manner previously described in respect of clamp member 43.

The inserts 39 and 40 include axially extending, thin walled skirt portions 51, 52, respectively, the distal ends of which are preferably flared slightly outwardly as at 53' respectively. The inserts 39 and 40 are likewise formed of relatively soft but highly resilient polymeric composition having good memory characteristics, suitably formulated Nylon or Delrin being preferred examples.

The distal end 53 of the lower insert 40 terminates in proximate spaced relation to annular shoulder 30 in the valve body, providing an annular gap 54 between the noted components. In similar fashion the distal end 53' of the upper insert 39 is disposed in proximate spaced relation to the upper annular shoulder 29, defining an annular gap 55 between the insert and shoulder.

Spool member 16 is mounted for axial reciprocal movement within the bore and is normally urged to the outward or solid line position shown in FIG. 3 against the force of coil spring 56 which is biased between annular shoulder 57 of the spool and retainer shoulder 58 of the upper insert 39.

The spool 16, adjacent its lower end, includes stop shoulder 59 which bottoms against inwardly directed shoulder 60 of the insert 40 to define the outward limiting position of the spool.

The spool includes a central reduced diameter waist portion 61. The spool also includes upper and lower annular grooves 62, 63, within which grooves are captured upper and lower O-rings 64, 65.

The outer peripheral portions of the skirts 51, 52 are spaced away from the registering portions of the bore 24 whereby there is defined in the area between the skirts and the bore annular chambers 66, 67, which chambers register, respectively, with the outlet portions 33 and 34.

As shown in FIG. 3, wherein the valve is in the non-dispensing condition, gas under pressure from input port 31 is permitted to pass through the gap 54 and into the chamber 67 surrounding the skirt 52 and then through outlet port 34. It will thus be seen that pressure is maintained in conduit 38.

When the spool is lifted to the dot and dash position FIG. 3 (solid line position, FIG. 4), the lower O-ring 65 will shift clear of skirt 52 and seal with the central portions 68 within the bore, thereby blocking passage to the port 34. Concomittantly, the upper O-ring 64 will shift clear of portion 68 in the valve body and seal with skirt 51 of the upper insert 39, thereby permitting gas to pass through the annular space 55 and to the outlet 33.

In operating principle the valve described is quite similar to conventional four-way valves.

The valve of the present invention departs from the conventional valve in the provision of the reduced thickness skirt portions which cooperate with the O-rings in such manner that the seal between skirt and O-ring is defined by an outward deflection of the skirts and an inward deflection of the O-rings. The interaction of the O-rings and skirts produces an annular bulge at the portion of the skirt which, at that time, is in registry with the ring.

As a result of the interaction of O-ring and skirt, the seal defined is highly efficient and yet the deformation of the O-ring is not nearly as great as would be necessary to achieve a comparable seal if the O-ring rode against a rigid and non-radially deformable surface, as is conventionally employed in four-way valves.

Additionally, with the described arrangement the force necessary to produce an axial movement of the spool relative to the valve body is substantially lower than would be the case where an O-ring having equivalent sealing properties was in contact with a rigid surface.

As diagrammatically shown in FIG. 2, when the valve spool 16 is shifted from the position of FIG. 3 to that of FIG. 4, with resultant pressurizing of conduit 37, piston 69 is shifted in cylinder 70, opening valves (not shown) which connect the pressurized reservoir 12 and syrup dispenser 14 with the dispenser spout 20, thereby discharging carbonated drink into the glass 22.

When the pressure of the glass against the paddle 18 is removed, spring 56 returns the valve spool to the position of FIG. 3, pressurizing conduit 38, shifting the position of piston 70 and thus interrupting flow from the reservoir and dispenser.

As will be appreciated from the above description, the home dispenser device of the invention is highly advantageous in that the dispensing valve may be shifted into position with a minimal amount of force, enabling the same to be tripped by readily deformable containers, such as polystyrene cups, etc.

The valve may be actuated over an extremely high number of operating cycles without loss of sealing function due to the unique interplay of the relatively lightly compressed O-ring and the ready radial deformability of the skirt members.

Additionally, by providing flared ends on the skirts, the transition of the O-rings of the spool from surface to surface is accompanied by a minimal amount of damage or wear on the O-rings such as would be encountered if both components employed sharp right angle corners.

Optionally, a bevel may be formed also on the interior surface of the valve body by the transition where the O-ring leaves the skirt and seals against the valve body.

As will be understood by those skilled in the art and familiarized with the instant disclosure numerous changes in details of construction may be made without departing from the spirit of the present invention. Accordingly the same is to be broadly construed within the scope of the appended claims.

Having thus described the invention and illustrated its use, what is claimed as new and is desired to be secured by Letters Patent is:

1. A low pressure activated four-way valve for a home soda dispenser comprising a valve body having a through-going cylindrical bore, first and second resilient polymeric inserts mounted in sealing relation in the distal ends of said bore, said inserts including radially outwardly deflectible, axially inwardly directed cylindrical skirt members, first and second annular shoulder portions extending from said body radially into said bore, the distal ends of each said skirt being disposed in proximate spaced relation to a respective one of said shoulder portions, the external surfaces of said skirts being spaced from said bore to define first and second annular chambers, a valve spool axially movably mounted in said bore, first and second resilient annular seal members mounted in spaced relation on said spool and defining a waist portion therebetween, said seal members being slidable into sealing connection with portions of said bore disposed between said ends of said skirts, said spool being shiftable between first and second limiting positions, one said seal member being disposed in one said skirt in said first limiting position and the other said seal member being disposed in the other said skirt in said second limiting position, said seal members being sized radially outwardly to deform said skirts when the same are disposed therein, first and second ports formed in said body portion in communication, respectively, with said first and second annular chambers, and an inlet port formed in said body in communication with said waist portion.

2. A valve in accordance with claim 1 and including means for mounting said inserts in said bore comprising an annular stop shoulder formed in said bore in proximate relation to each of said distal ends, an annular complemental shoulder on said each of said inserts, gasket means compressed between said stop shoulders and said complemental shoulders for forming a seal therebetween, and clamp means adjacent each end of said bore bearing against the outermost ends of said inserts, thereby to maintain said gasket means in compressed condition between said stop and complemental shoulders.

3. A valve in accordance with claim 2 wherein said body portion is formed of polymeric material and said clamp means comprises a radially expansible metallic member having radially extending spring fingers embedded into the material of said body portion, whereby said clamp members and inserts may be expelled axially from said bore responsive to excess pressure buildup in said inlet port.

4. A valve in accordance with claim 1 wherein said distal ends of said skirts are flared radially outwardly.

5. A home dispenser device for carbonated beverages including a source of gas under pressure, a carbonated water reservoir, a syrup dispenser, a dispensing nozzle, actuator means for releasing syrup and carbonated water to said dispenser nozzle, a low pressure activated four-way valve for energizing said actuator means, said valve comprising a valve body having a through-going cylindrical bore, first and second resilient polymeric inserts mounted in sealing relation in the distal ends of said bore, said inserts including radially outwardly deflectible, axially inwardly directed cylindrical skirt members, first and second annular shoulder portions extending from said body radially into said bore, the distal ends of each said skirt being disposed in proximate spaced relation to a respective one of said shoulder portions, the external surfaces of said skirts being spaced from said bore to define first and second annular chambers, a valve spool axially movably mounted in said bore, first and second resilient annular seal members mounted in spaced relation on said spool and defining a waist portion therebetween, said seal members being slidable into sealing connection with portions of said bore disposed between said ends of said skirts, said spool being shiftable between first and second limiting positions, one said seal member being disposed in one said skirt in said first limiting position and the other said seal member being disposed in the other said skirt in said second limiting position, said seal members being sized radially outwardly to deform said skirts when the same are disposed therein, first and second ports formed in said body portion in communication, respectively, with said first and second annular chambers, and an inlet port formed in said body in communication with said waist portion.

6. A dispenser device in accordance with claim 5 and including means for mounting said inserts in said bore comprising an annular stop shoulder formed in said bore in proximate relation to each of said distal ends, an annular complemental shoulder on said each of said inserts, gasket means compressed between said stop shoulders and said complemental shoulders for forming a seal therebetween, and clamp means adjacent each end of said bore bearing against the outermost ends of said inserts, thereby to maintain said gasket means in compressed condition between said stop and complemental shoulders.

7. A dispenser device in accordance with claim 6 wherein said body portion is formed of polymeric material and said clamp means comprises a radially expansible metallic member having radially extending spring fingers embedded into the material of said body portion, whereby said clamp members and inserts may be expelled axially from said bore responsive to excess pressure buildup in said inlet port.

8. A dispenser device in accordance with claim 5 wherein said distal ends of said skirts are flared radially outwardly.

9. A dispenser device in accordance with claim 5 including a trip portion extending from said spool beyond said body portion and a dispenser lever pivotally mounted on said device for movement toward and away from said trip portion responsive to engagement of a receiver cup against said lever.

* * * * *